(12) United States Patent
Yamamoto et al.

(10) Patent No.: US 9,008,882 B2
(45) Date of Patent: Apr. 14, 2015

(54) VEHICLE AND CONTROL METHOD OF VEHICLE

(75) Inventors: Masaya Yamamoto, Kasugai (JP); Itaru Seta, Toyota (JP)

(73) Assignees: Toyota Jidosha Kabushiki Kaisha, Toyota (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/110,722

(22) PCT Filed: Nov. 28, 2011

(86) PCT No.: PCT/JP2011/077363
§ 371 (c)(1),
(2), (4) Date: Oct. 9, 2013

(87) PCT Pub. No.: WO2012/157137
PCT Pub. Date: Nov. 22, 2012

(65) Prior Publication Data
US 2014/0136037 A1 May 15, 2014

(30) Foreign Application Priority Data
May 16, 2011 (JP) ................................. 2011-109564

(51) Int. Cl.
*B60L 9/00* (2006.01)
*B60L 15/00* (2006.01)
(Continued)

(52) U.S. Cl.
CPC .............. *B60L 15/00* (2013.01); *B60L 11/1861* (2013.01); *B60L 2240/12* (2013.01); *B60L 2260/52* (2013.01); *B60L 2260/54* (2013.01); *B60L 2250/16* (2013.01); *Y02T 10/7044* (2013.01); *Y02T 10/7005* (2013.01); *Y02T 10/705* (2013.01); *B60L 11/005* (2013.01);
(Continued)

(58) Field of Classification Search
CPC ....... B60L 15/00; B60W 20/00; B60W 10/08; B60W 10/06; Y02T 10/6265
USPC .......................... 701/22; 180/65.285; 903/903
See application file for complete search history.

(56) References Cited

U.S. PATENT DOCUMENTS 5,479,085 A * 12/1995 Honda et al. ................... 320/134
6,205,379 B1 * 3/2001 Morisawa et al. ............... 701/22
(Continued)

FOREIGN PATENT DOCUMENTS

| JP | A-6-167551 | 6/1994 |
|---|---|---|
| JP | A-2003-219503 | 7/2003 |
| JP | A-2007-32387 | 2/2007 |

*Primary Examiner* — Tuan C. To
*Assistant Examiner* — Shardul Patel
(74) *Attorney, Agent, or Firm* — Oliff PLC

(57) ABSTRACT

A vehicle capable of traveling using electric power from a power storage device mounted thereon has an ECU executing, when traveling by electric power from the power storage device: the step of calculating a reference electric consumption based on an average operating point determined by an average vehicle speed and average driving force for every predetermined period; the step of calculating an actual electric consumption based on power consumption and travel distance during the period; the step of calculating a predicted electric consumption by a smoothing processing based on the reference electric consumption and actual electric consumption; and the step of calculating an allowed travel distance RMD that the vehicle can travel by the electric power remaining in the power storage device, based on the predicted electric consumption and the SOC of the power storage device.

12 Claims, 5 Drawing Sheets

(51) Int. Cl.
*B60L 11/18* (2006.01)
*B60L 11/00* (2006.01)
*B60L 11/14* (2006.01)
*B60W 20/00* (2006.01)

(52) U.S. Cl.
CPC ............ *B60L 11/14* (2013.01); *B60L 2210/10* (2013.01); *B60L 2210/40* (2013.01); *B60L 2220/14* (2013.01); *B60W 20/00* (2013.01); *Y10S 903/903* (2013.01); *Y02T 10/7077* (2013.01); *Y02T 10/7241* (2013.01); *Y02T 10/7022* (2013.01); *Y02T 10/7216* (2013.01); *Y02T 10/70* (2013.01)

(56) References Cited

U.S. PATENT DOCUMENTS

| | | | |
|---|---|---|---|
| 6,383,114 B1* | 5/2002 | Hoshiya et al. | 477/2 |
| 6,524,217 B1* | 2/2003 | Murakami et al. | 477/5 |
| 6,549,840 B1* | 4/2003 | Mikami et al. | 701/69 |
| 2010/0324762 A1* | 12/2010 | Imaseki et al. | 701/22 |
| 2011/0082611 A1* | 4/2011 | Shiba | 701/22 |
| 2011/0163724 A1* | 7/2011 | Migaud et al. | 320/136 |
| 2013/0096764 A1* | 4/2013 | Yamamoto et al. | 701/22 |
| 2013/0184919 A1* | 7/2013 | Kabe | 701/22 |

* cited by examiner

VEHICLE AND CONTROL METHOD OF VEHICLE

TECHNICAL FIELD

The present invention relates to a vehicle and a control method of a vehicle. More particularly, the present invention relates to estimation control of an allowed travel distance of a vehicle generating traction driving force using electric power from a power storage device.

BACKGROUND ART

As an environment-friendly vehicle in recent years, attention is focused on a vehicle that has a power storage device (for example, a secondary battery, capacitor, or the like) mounted and that travels by the driving force generated by a motor using electric power stored in the power storage device. Such a vehicle includes, for example, an electric vehicle, a hybrid vehicle, a fuel cell vehicle, and the like.

In such vehicles, it is often necessary to predict the distance the vehicle can travel with the electric power remaining in the power storage device. Even if the electric power in the power storage device is depleted, the hybrid vehicle and fuel cell vehicle can travel by electric power generated through the engine or fuel cell, or by the driving force from the engine. However, in the case where the electric power of the power storage device is depleted in an electric vehicle that is absent of means for supplying electric power other than the power storage device, predicting the remaining allowed travel distance appropriately becomes critical since traveling cannot be continued unless the power storage device is charged.

Japanese Patent Laying-Open No. 2003-219503 (PTD 1) discloses the approach of calculating, in an electric vehicle that travels through a routine course on a regular basis, the distance the vehicle can continue to travel with the electric power currently remaining in the power storage device based on the electric consumption and travel-continued distance in the previous traveling operation of the routine course, so as to determine whether the vehicle can travel as far as the destination.

CITATION LIST

Patent Document

PTD 1: Japanese Patent Laying-Open No. 2003-219503
PTD 2: Japanese Patent Laying-Open No. 06-167551
PTD 3: Japanese Patent Laying-Open No. 2007-032387

SUMMARY OF INVENTION

Technical Problem

However, by the approach disclosed in Japanese Patent Laying-Open No. 2003-219503 (PTD 1), there is a possibility of the power consumption being different even on the same traveling path, depending upon how the user drives the vehicle. The calculation of the allowed travel distance based on information of the previous traveling operation is not necessarily high in accuracy.

Furthermore, the allowed travel distance calculated based on the state of the previous traveling operation for a specific routine course may not appropriately reflect the current state of the vehicle that is changing from moment to moment in the case where the traveling course differs or when the environment such as the road state and traffic differs.

In view of the foregoing, an object the present invention is to appropriately estimate the allowed travel distance based on the remaining amount in a power storage device at a vehicle that generates traction driving force using electric power from the power storage device.

Solution to Problem

A vehicle according to the present invention includes a rotating electric machine and a control device, capable of traveling using electric power of a power storage device mounted thereon. The rotating electric machine generates traction driving force using electric power from the power storage device. When traveling by electric power from the power storage device, the control device calculates a first electric consumption based on an average operating point determined from an average vehicle speed and average driving force for every predetermined period, calculates a second electric consumption based on power consumption and travel distance during the predetermined period, and calculates an allowed travel distance that the vehicle can travel by the electric power remaining in the power storage device, based on the first and second electric consumption, and a state of charge of the power storage device.

Preferably, the control device calculates a correction factor from the first electric and second electric consumption, and obtains a predicted electric consumption by correcting the first electric consumption using the correction factor to calculate the allowed travel distance based on the predicted electric consumption and the state of charge of the power storage device.

Preferably, the correction factor is calculated based on the ratio of the second electric consumption to the first electric consumption.

Preferably, the control device calculates the predicted electric consumption based on an operating point corresponding to an average operating point corrected using a predetermined time constant so as to be smoothed in a time axis direction.

Preferably, the control device smoothes the average vehicle speed and average driving force using a different time constant in the smoothing operation.

Preferably, the time constant for the average vehicle speed is smaller than the time constant for the average driving force.

Preferably, the control device performs smoothing for the average vehicle speed using a different time constant between the driving force required from the road inclination and the remaining driving force of the traction driving force.

Preferably, the rotating electric machine is coupled to a driving wheel, and can generate electric power by the rotative force of the driving wheel. The control device calculates the second electric consumption based on a traveling distance under a state where the electric power generated by the rotating electric machine is below a threshold value, among the travel distance.

Preferably, the vehicle further includes an engine. The traction driving force is output using the driving force from the rotating electric machine and the driving force from the engine. The control device executes calculation of an allowed travel distance when the engine is in a non-driven state.

Preferably, the vehicle further includes a display unit to notify the user about the allowed travel distance.

A control method of a vehicle according to the present invention is directed to a vehicle capable of traveling using electric power from a power storage device mounted thereon. The vehicle includes a rotating electric machine for generating traction driving force using electric power from the power storage device. The control method includes the steps of, when traveling by electric power from the power storage device: calculating a first electric consumption based on an average operating point determined from an average vehicle speed and average driving force for every predetermined period; calculating a second electric consumption based on power consumption and travel distance during a predetermined period; and calculating an allowed travel distance that the vehicle can travel by the electric power remaining in the power storage device, based on the first and second electric consumption, and the state of charge of the power storage device.

Advantageous Effects of Invention

According to the present invention, the distance that the vehicle can travel with the remaining amount in a power storage device can be estimated appropriately in a vehicle generating traction driving force using electric power from the power storage device.

DESCRIPTION OF EMBODIMENTS

Figure 1:
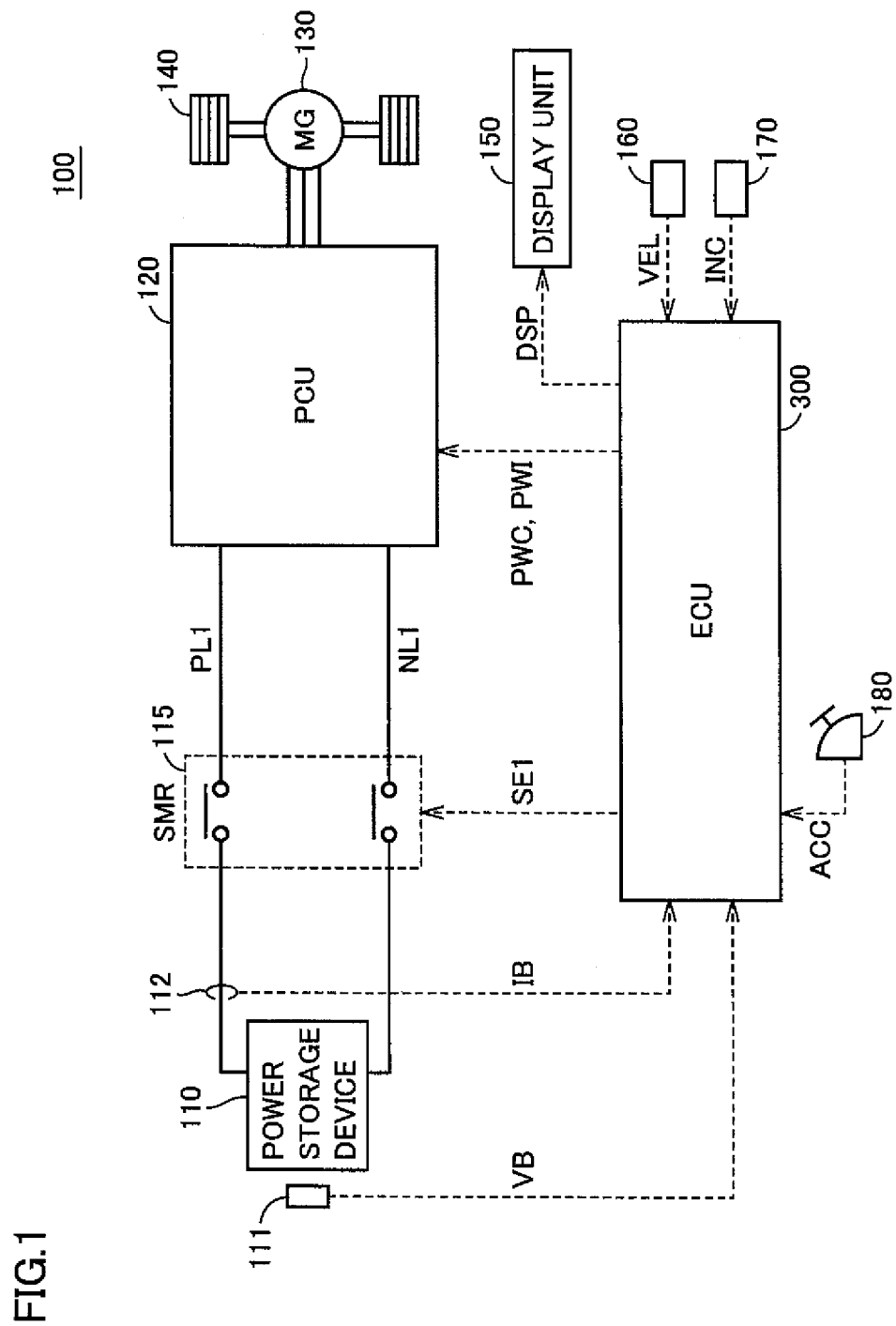
FIG. 1 is an entire block diagram of a vehicle according to an embodiment.

Embodiments of the present invention will be described in detail hereinafter with reference to the drawings. In the drawings, the same or corresponding elements have the same reference characters allotted, and description thereof will not be repeated.

FIG. 1 is an entire block diagram of a vehicle 100 according to the present embodiment. Referring to FIG. 1, vehicle 100 includes a power storage device 110, a voltage sensor 111, a current sensor 112, a system main relay (SMR) 115, a power control unit (PCU) 120 that is a driving device, a motor generator 130, a driving wheel 140, a display unit 150, a speed sensor 160, an inclination sensor 170, and an electronic control unit (ECU) 300 that is a control device.

Power storage device 110 is an electric power storing component configured to be charged and discharged. Power storage device 110 includes a secondary battery such as a lithium ion battery, nickel-metal hydride battery, or lead battery, or a power storage element such as an electrical double layer capacitor.

Power storage device 110 is connected to PCU 120 via a power line PL1 and a ground line NL1. Power storage device 110 supplies to PCU 120 electric power for generating the driving force of vehicle 100. Power storage device 110 stores electric power generated at motor generator 130. The output of power storage device 110 is approximately 200V, for example.

Voltage sensor 111 detects voltage VB of power storage device 110 and outputs the detected result to ECU 300. Current sensor 112 detects current TB input to or output from the power storage device, and provides the detection value to ECU 300.

The relay included in SMR 115 is inserted in power line PL1 and ground line NL1 that connects power storage device 110 and PCU 120. SMR 115 switches the supply and cut off of electric power between power storage device 110 and PCU 120 based on a control signal SE1 from ECU 300.

PCU 120 includes a converter, an inverter, and the like, all not shown. The converter is under control by a control signal PWC from ECU 300 to convert the electric voltage from power storage device 110. The inverter is under control by a control signal PWI from ECU 300 to drive motor generator 130 using the electric power converted at the converter.

Motor generator 130 is an AC rotating electric machine, for example a permanent magnet type synchronous electric motor including a rotor in which a permanent magnet is embedded.

The output torque from motor generator 130 is transmitted to driving wheel 140 to cause vehicle 100 to travel. During a regenerative braking operation mode of vehicle 100, motor generator 130 can generate electric power by the rotative force of driving wheel 140. The generated electric power is converted into the charging electric power for power storage device 110 by PCU 120.

In a hybrid vehicle having an engine (not shown) mounted in addition to motor generator 130, the required vehicle driving force is generated by the cooperative operation of the engine and motor generator 130. In this case, power storage device 110 can be charged using the electric power generated by the rotation of the engine.

In other words, vehicle 100 of the present embodiment corresponds to a vehicle incorporating an electric motor for generating vehicle driving force, and includes a hybrid vehicle generating vehicle driving force by an engine and an electric motor, an electric vehicle not incorporating an engine, a fuel cell vehicle, or the like.

Display unit 150 provides the display of various type of information for the user based on a control signal DSP from ECU 300.

Speed sensor 160 detects a signal VEL related to the vehicle speed of vehicle 100 for output to ECU 300. Speed sensor 160 may be, for example, a rotation angle sensor for detecting the rotation angle of motor generator 130, or a speed sensor for detecting the rotation speed of driving wheel 140.

Inclination sensor 170 is a sensor for detecting the inclination of a road when vehicle 100 is traveling on a slope. For example, inclination sensor 170 may include an acceleration sensor or the like. Inclination sensor 170 outputs to ECU 300 an inclination signal INC indicating the detected inclination of the road.

ECU 300 includes a CPU (Central Processing Unit), a storage device and an input/output buffer, all not shown in FIG. 1, to input a signal from each sensor and output a control signal to each device, and also controls vehicle 100 and each device. Control thereof is not limited to processing through software, and can be processed through dedicated hardware (electronic circuit).

ECU 300 receives from voltage sensor 111 and current sensor 112 a detection value of voltage VB and current IB, respectively, of power storage device 110. ECU 300 calculates the state of charge (hereinafter, also referred to as SOC) of power storage device 110 based on voltage VB and current IB.

ECU 300 receives a signal ACC indicating the operated amount of an accelerator pedal 180. ECU 300 calculates the vehicle driving force required by the user based on operated amount ACC of accelerator pedal 180.

The charging of power storage device 110 in vehicle 100 of the type set forth above cannot be completed in a short time such as in the case of fuel supply for a vehicle that travels through an engine, and requires a relatively long period of time.

Therefore, identifying how much the vehicle can travel with the amount currently remaining in the power storage device is important for the user.

Figure 2:
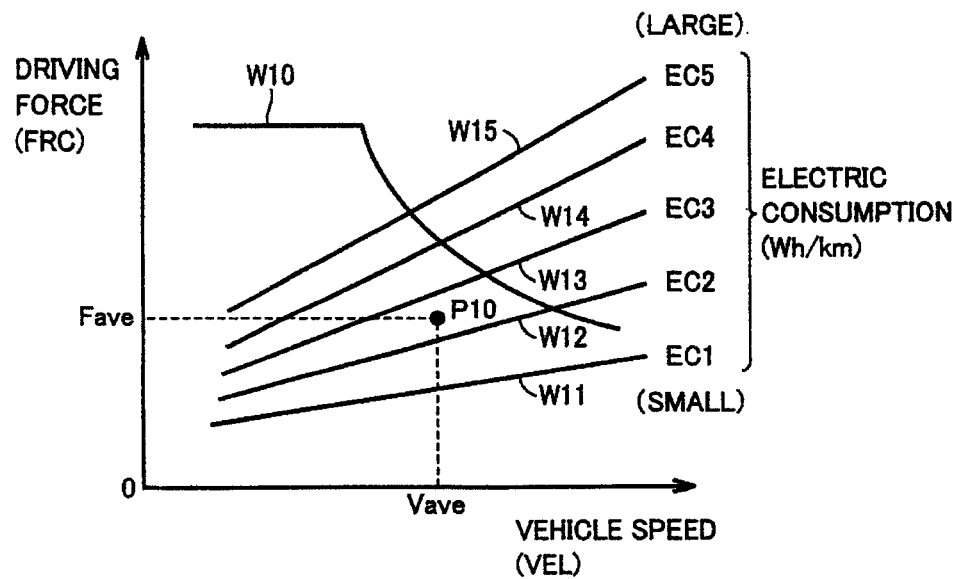
FIG. 2 is a diagram to describe the relationship between vehicle speed, driving force, and electric consumption.

FIG. 2 is a diagram to describe the relationship between the vehicle speed, driving force, and electric consumption of vehicle 100. In FIG. 2, the horizontal axis indicates vehicle speed VEL whereas the vertical axis indicates driving force FRC. Line W10 in FIG. 2 represents the maximum driving force that can be output at each vehicle speed VEL. Lines W11-W15 in FIG. 2 represent the amount of electric power consumed per unit travel distance, i.e. the so-called electric consumption (Wh/km). In general, a lower electric consumption implies better energy efficiency.

Referring to FIG. 2, it is known that the electric consumption during steady running is determined substantially in a one-to-one correspondence by an operating point (for example, point P10 in FIG. 2) defined by an average vehicle speed Vave and average driving force Fave at a certain time interval, in an electric vehicle such as vehicle 100 shown in FIG. 1 or in the case where a hybrid vehicle travels through the electric power from the power storage device alone, having the engine stopped.

However, even if the combination of average vehicle speed Vave and average driving force Fave at a certain time interval are identical, the consumed amount of electric power may differ between the case where the vehicle travels at substantially a constant speed and the case where the vehicle runs while frequently repeating acceleration and deceleration. Moreover, the consumed amount of electric power may differ between the case where the vehicle travels on a flat road and the case where the vehicle travels on an inclining road such as a mountain road.

In the case where the allowed travel distance is calculated by the remaining amount in the power storage device using the electric consumption determined from the operating point defined by average vehicle speed Vave and average driving force Fave, the calculated allowed travel distance may lack reliability since the user's driving manner (the so-called tendency) and/or the road status are not properly reflected.

Particularly in the case where the electric power in the power storage device is depleted during traveling for an electric vehicle that travels using only the electric power stored in the power storage device, the vehicle will not be able to move any further. Therefore, notifying the user properly about the allowed travel distance according to the remaining amount in the power storage device becomes more critical, as compared to a hybrid vehicle having another driving mechanism such as the engine and/or power generating mechanism, and a fuel cell vehicle.

To this end, estimation control of an allowed travel distance is executed in the present embodiment. Using a predetermined standard map as shown in FIG. 2, a reference electric consumption determined from an operating point defined by average vehicle speed Vave and average driving force Fave at a certain time interval is compared with an actual electric consumption determined from the actual travel distance and actual amount of consumed electric power at that certain time interval, and the remaining allowed travel distance is calculated using a predicted electric consumption calculated based on difference therebetween.

Specifically, the ratio of actual electric consumption to reference electric consumption (=actual electric consumption/reference electric consumption) is calculated as a correction factor. By correcting the electric consumption in the standard map shown in FIG. 2 using the correction factor, the effect by the user's driving manner and road status is reflected into the electric consumption.

If the calculated correction factor is directly fully reflected, there is a possibility of a sudden increase/decrease of the electric consumption being frequently repeated in a short period of time, which in turn changes the allowed travel distance frequently. Therefore, there is a possibility of the reliability of the estimated allowed travel distance being degraded.

Thus, in the present embodiment, a smoothing process to smooth the fluctuation caused by the correction factor to be mild over time, i.e. learning processing, is further applied when the correction factor is to be reflected. Accordingly, by suppressing an abrupt change in the correction factor while reflecting the effect by the user's driving manner and road status, degradation in the reliability of the estimated value of the allowed travel distance can be prevented.

In the case where the reference electric consumption is to be calculated using the map of FIG. 2, an average operating point by average vehicle speed Vave and average driving force Fave must be set. It is possible that this average operating point may change abruptly when the vehicle moves from an express highway to a general road or from level ground to a mountain road. Since there is a possibility of the value of the reference electric consumption obtained from the map of FIG. 2 being changed drastically by an abrupt change in the average operating point, a smoothing process is preferably performed in the setting of the average operating point by average vehicle speed Vave and average driving force Fave, likewise with the foregoing correction factor.

At this stage, the driving force has the level of smoothing, i.e. time constant, altered depending upon the application of the driving force, as will be described hereinafter in FIGS. 3 and 4.

Figure 3:
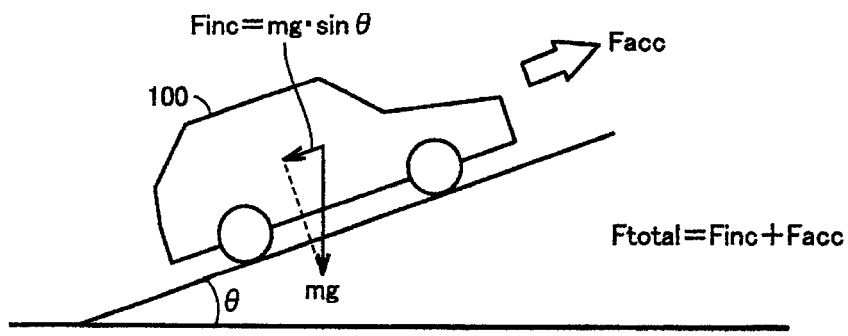
FIG. 3 is a first diagram to describe the relationship between the road inclination and driving force.

FIG. 3 is a first diagram to describe the relationship between road inclination and driving force. Referring to FIG. 3, the driving force Finc required to counteract the component of the gravity on vehicle 100 along the inclination is represented by the following equation (1), where "m" is the mass of vehicle 100, and "g" is the gravitational acceleration in a state where vehicle 100 is located on a slope of inclination angle θ.

$$Finc = mg \cdot \sin\theta \quad (1)$$

Driving force Finc becomes greater as inclination angle θ increases.

Assuming that the driving force required for vehicle 100 to accelerate in the traveling direction and to maintain the speed is Facc, the total driving force Ftotal to be output from vehicle 100 is represented by the following equation (2).

$$Ftotal = Finc + Facc \quad (2)$$

Figure 4:
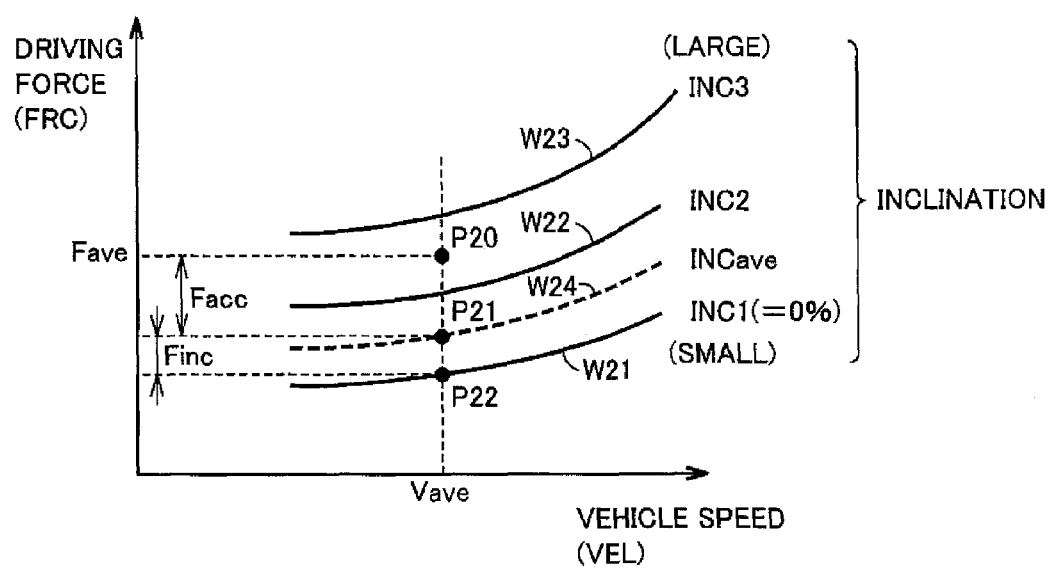
FIG. 4 is a second diagram to describe the relationship between the road inclination and driving force.

FIG. 4 is a diagram to describe the change in the average operating point and driving force in the map of FIG. 2. In FIG. 4, lines W21-W24 each represent vehicle speed VEL and driving force FRC required at a constant road inclination.

Referring to 4, consider the case where the average operating point now changes from an operating point P22 indicating level ground to point P20. This corresponds to the case where vehicle speed VEL is substantially constant, and only driving force FRC increases.

In the case where the average road inclination at the relevant time interval is line W24 represented by a broken line, the driving force from point P22 up to point P20 on line W24, among the driving force changing from point P22 to point P21, is the driving force Finc required to counteract the gravity generated by the road inclination whereas the remaining driving force (from point P21 to point P22) is driving force Facc required for acceleration and maintaining the speed.

Driving force Facc required for acceleration and maintaining the speed continues for a relatively long period of time in order to maintain travel in the time interval where the operating point is obtained. In contrast, driving force Finc required to counteract the gravity generated by the road inclination will generally be output for only a relatively short period of time as compared to driving force Facc unless the slope continues along a long distance.

Therefore, if the time constant is set small for driving force Finc, the operating point will too sensitively follow a change effected over a relatively short period. Therefore, by setting a larger time constant for driving force Finc corresponding to road inclination than for driving force Facc corresponding to the vehicle speed to achieve a more mild change, the stability of the estimated value on the allowed travel distance is improved, allowing the reliability of the estimated value on the allowed travel distance to be further improved. In other words, since driving force Facc corresponding to the vehicle speed that has a high connection with the user's driving manner is more likely to be reflected in the obtained result, the average operating point can be calculated taking into consideration the user's tendency.

Figure 5:
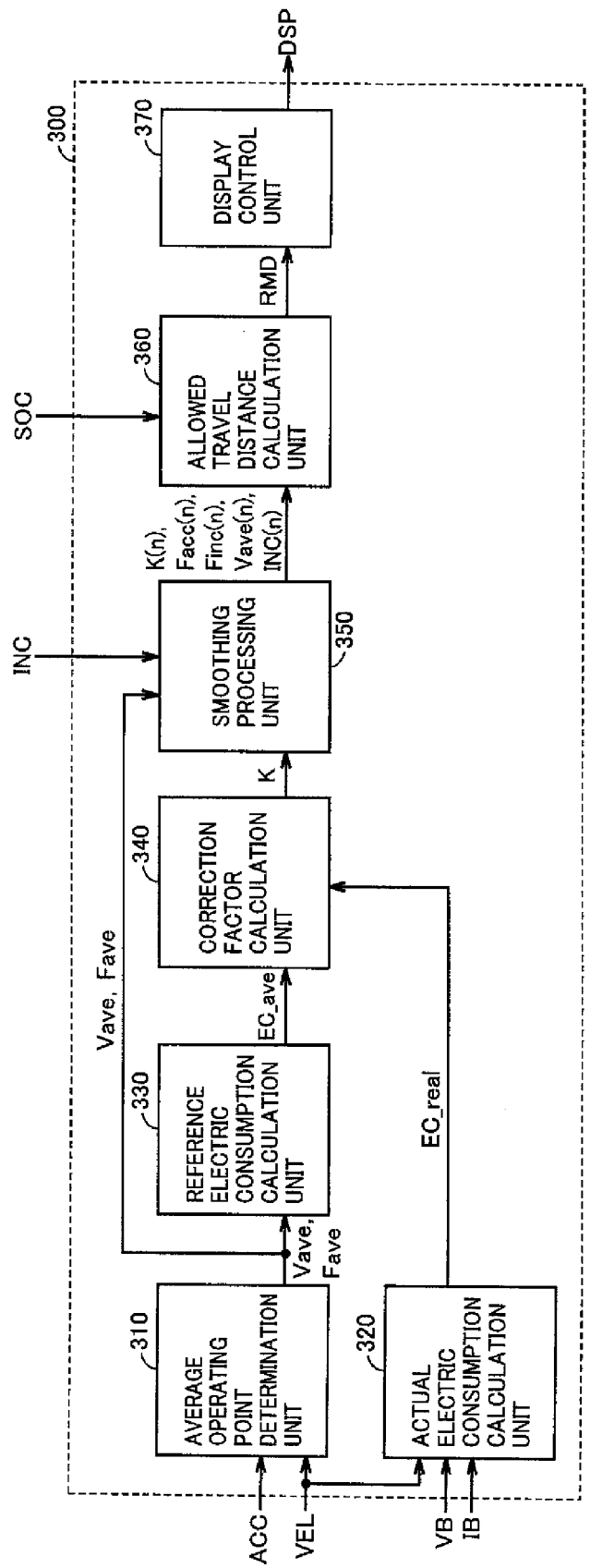
FIG. 5 is a functional block diagram to describe estimation control of an allowed travel distance executed at an ECU in the present embodiment.

FIG. 5 is a functional block diagram to describe estimation control of an allowed travel distance executed at ECU 300 in the present embodiment. Each functional block in FIG. 5 is realized by processing in hardware or software through ECU 300.

Referring to FIGS. 1 and 5, ECU 300 includes an average operating point determination unit 310, an actual electric consumption calculation unit 320, a reference electric consumption calculation unit 330, a correction factor calculation unit 340, a smoothing processing unit 350, an allowed travel distance calculation unit 360, and a display control unit 370.

Average operating point determination unit 310 receives operated amount ACC on accelerator pedal 180 and vehicle speed VEL from speed sensor 160. On the basis of operated amount ACC on accelerator pedal 180, average driving force Fave at a predetermined time interval is calculated, and average vehicle speed Vave at that predetermined time interval is calculated from vehicle speed VEL. Average operating point determination unit 310 outputs the calculated average vehicle speed Vave and average driving force Fave to reference electric consumption calculation unit 330 and smoothing processing unit 350.

Reference electric consumption calculation unit 330 receives average vehicle speed Vave and average driving force Fave from average operating point determination unit 310. Reference electric consumption calculation unit 330 uses a predetermined map such as that shown in FIG. 2 to calculate a reference electric consumption EC_ave corresponding to a standard state based on average vehicle speed Vave and average driving force Faye. Reference electric consumption calculation unit 330 outputs calculated reference electric consumption EC_ave to correction factor calculation unit 340.

Actual electric consumption calculation unit 320 receives voltage VB, current IB of power storage device 110, and vehicle speed VEL. On the basis of such information, actual electric consumption calculation unit 320 calculates actual electric consumption EC_real at the aforementioned predetermined time interval. Actual electric consumption calculation unit 320 outputs the calculated actual electric consumption EC_real to correction factor calculation unit 340.

Correction factor calculation unit 340 receives reference electric consumption EC_ave from reference electric consumption calculation unit 330 and actual electric consumption EC_real from actual electric consumption calculation unit 320. On the basis of such information, correction factor calculation unit 340 calculates and outputs to smoothing processing unit 350 a correction factor K to reflect the difference between reference electric consumption EC_ave and actual electric consumption EC_real into the map such as that shown in FIG. 2. Correction factor K can, by way of example, be defined as a ratio of actual electric consumption EC_real to reference electric consumption EC_ave, as shown in equation (3) below.

$$K = EC\_real / EC\_ave \qquad (3)$$

Smoothing processing unit 350 receives correction factor K from correction factor calculation unit 340, average vehicle speed Vave and average driving force Fave from average operating point determination unit 310, and inclination signal INC from inclination sensor 170. Smoothing processing unit 350 executes a smoothing processing such that the change from the previous calculation result to the current calculation value is not abrupt for the aforementioned information. For example, correction factor K may be calculated using a time constant $\alpha$ as in equation (4), where K (n−1) is the previous calculation result, K is the current calculation value, and K (n) is the calculation result after smoothing.

$$K(n) = K(n-1) + \alpha\{K - K(n-1)\} \qquad (4)$$

Here, $0 < \alpha < 1$.

In other words, smoothing processing unit 350 executes a learning operation on correction factor K, average vehicle speed Vave, average driving force Fave and inclination signal INC. In the operation, the time constant for each item can be set individually. Each time constant may be identical or different for the items.

Average driving force Fave can be divided into driving force Finc to counteract gravity imposed by the inclination of the road and driving force Facc to accelerate and maintain the vehicle speed, as described with reference to FIGS. 3 and 4. Smoothing is preferably carried out with a different time constant for each driving force. This is because, since driving force Finc of the inclining direction tends to increase/decrease in a relatively short period of time (i.e. abruptly) as compared to driving force Facc of the direction in which vehicle speed is developed, a direct reflection of the change to the calculation result will possibly render the calculation result unstable by the repetition of frequent increase and decrease. In other words, since driving force Facc corresponding to the vehicle speed that has a high connection with the tendency of the user's driving operation is more likely to be reflected in the calculation result, the average operating point can be calculated taking into consideration the user's tendency by setting the time constant for driving force Finc to achieve a more gentle change as compared to driving force Facc.

Smoothing processing unit 350 provides the calculation results K (n), Facc (n), Finc (n), Vave (n), and INC (n) obtained as set forth above to allowed travel distance calculation unit 360.

Allowed travel distance calculation unit 360 receives the calculation results from smoothing processing unit 350 and the SOC of power storage device 110. Allowed travel distance calculation unit 360 determines the operating point subjected to the smoothing processing, obtained based on the calculation results of smoothing processing unit 350. Then, allowed travel distance calculation unit 360 calculates the electric consumption for the relevant operating point from the map as shown in FIG. 2, and multiplies this value by a correction factor K (n) representative of the user's characteristic to estimate a predicted electric consumption. Then, allowed travel distance calculation unit 360 calculates an allowed travel distance RMD according to the remaining amount in power storage device 110 based on the estimated predicted electric consumption and SOC for output to display control unit 370.

Display control unit 370 receives allowed travel distance RMD from allowed travel distance calculation unit 360, and causes the value of that allowed travel distance RMD to be displayed at display unit 150 by a control signal DSP.

Figure 6:
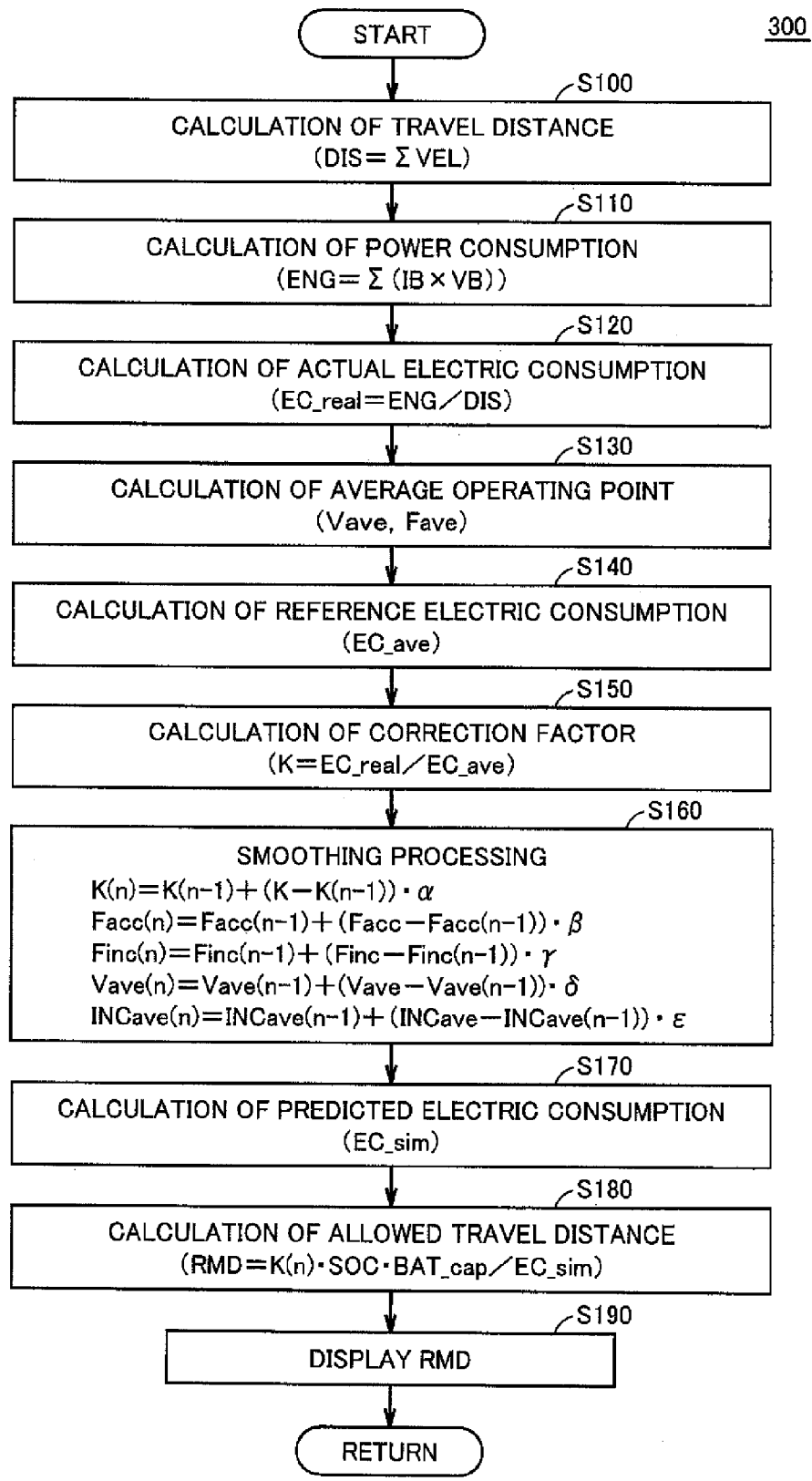
FIG. 6 is a flowchart to describe in detail the estimation control procedure of an allowed travel distance executed at an ECU in the present embodiment.

FIG. 6 is a flowchart to describe in detail the allowed travel distance estimation control process executed at ECU 300 in the present embodiment. The flowchart of FIG. 6 is realized by executing a program prestored in ECU 300 at a predetermined cycle. Alternatively, some of the steps may be developed in dedicated hardware (electronic circuit) to be realized in processing.

Referring to FIGS. 1 and 6, ECU 300 calculates the travel distance for a predetermined time interval by accumulating vehicle speed VEL at a predetermined time interval at step (hereinafter, step abbreviated as S) 100.

In addition, ECU 300 calculates power consumption ENG at a predetermined time interval by accumulating the product of current TB and voltage VB of power storage device 110. Although not shown in FIG. 1, power consumption ENG calculated from current IB and voltage VB of power storage device 110 also includes the electric power consumed by an auxiliary load such as an air conditioner and audio set. Therefore, in calculating the electric consumption at step S120, only the electric power used for the vehicle driving force, i.e. the aforementioned power consumption ENG minus the electric power used by the auxiliary load, is preferably used.

At S120, ECU 300 calculates actual electric consumption EC_real based on the travel distance calculated at S100 and power consumption ENG calculated at S110.

Then, ECU 300 calculates the average operating point (average vehicle speed Vave and average driving force Fave) at a predetermined time interval (S130), and calculates reference electric consumption EC_ave at a predetermined time interval using a map such as that shown in FIG. 2 (S140). At S150, ECU 300 calculates correction factor K from actual electric consumption EC_real and reference electric consumption EC_ave.

At S160, ECU 300 executes a smoothing processing using individual time constants for correction factor K, driving force Facc of the direction in which vehicle speed is developed, driving force Finc of the inclining direction, average vehicle speed Vave and inclination signal INC.

At S170, ECU 300 applies the smoothed operating point to a map as shown in FIG. 2 to calculate predicted electric consumption EC_sim. At S180, ECU 300 obtains by calculation a predicted allowed travel distance RMD based on smoothing-subjected correction factor K (n), SOC, the total capacitance BAT_cap of power storage device 110, and predicted electric consumption EC_sim.

At S190, ECU 300 causes display unit 150 to display the calculated allowed travel distance RMD.

In the case where power is generated by a regenerative operation of motor generator 130 in association with a speed reducing operation by the user, there is a possibility of the aforementioned predicted electric consumption being calculated as a lower value than necessary. In such an event, an over estimated allowed travel distance will be displayed to the user, leading to the possibility of giving an erroneous acknowledgment for the user. Therefore, it is preferable not to reflect the travel distance during a period where regenerative operation is performed when calculating the actual electric consumption.

In the case where the above-described estimation control is applied to a hybrid vehicle, when the vehicle is traveling using the driving force of the engine or when electric power is generated by the motor generator by driving the engine, the relationship between the actual travel distance and power consumption may not be represented appropriately. Therefore, the relevant estimation control is preferably applied to a hybrid vehicle when in a state where the engine is not driven.

By the control according to the processing set forth above, a predicted electric consumption is calculated while learning (smoothing processing) about the ever-changing state of the vehicle that generates traction driving force using the electric power from the power storage device, allowing the allowed travel distance to be calculated according to the remaining amount in the power storage device based on the predicted electric consumption. Accordingly, the driving operation tendency that may differ between users can be reflected, allowing calculation of a more improved electric consumption and allowed travel distance.

By carrying out smoothing using an individual time constant for each item in the smoothing operation, the driving operation tendency can be reflected appropriately according to the characteristics of each item, such as suppressing unstable calculation results while improving the followability with respect to change.

It should be understood that the embodiments disclosed herein are illustrative and non-restrictive in every respect. The scope of the present invention is defined by the terms of the claims, rather than the description set forth above, and is intended to include any modification within the scope and meaning equivalent to the terms of the claims.

REFERENCE SIGNS LIST

100 vehicle; 110 power storage device; 111 voltage sensor; 112 current sensor; 115 SMR; 120 PCU; 130 motor generator; 140 driving wheel; 150 display unit; 160 speed sensor; 170 inclination sensor; 180 accelerator pedal; 300 ECU; 310 average operating point determination unit; 320 actual electric consumption calculation unit; 330 reference electric consumption calculation unit; 340 correction factor calculation unit; 350 smoothing processing unit; 360 allowed travel distance calculation unit; 370 display control unit; NL1 ground line; PL1 power line.

The invention claimed is:

1. A vehicle capable of traveling using electric power from a power storage device mounted on the vehicle, comprising:
 a rotating electric machine for generating traction driving force using electric power from the power storage device, and
 a control device,
 when the vehicle is traveling by electric power from the power storage device, the control device being configured to calculate a first electric consumption based on an average operating point determined from an average vehicle speed and average driving force for every predetermined period, to calculate a second electric consumption based on power consumption and travel distance during the predetermined period, and to calculate an allowed travel distance that the vehicle can travel by the electric power remaining in the power storage device, based on the first and second electric consumption, and a state of charge of the power storage device.

2. The vehicle according to claim 1, wherein the control device calculates a correction factor from the first and second electric consumption, obtains a predicted electric consumption by correcting the first electric consumption using the correction factor, and calculates the allowed travel distance based on the predicted electric consumption and the state of charge of the power storage device.

3. The vehicle according to claim 2, wherein the correction factor is calculated based on a ratio of the second electric consumption to the first electric consumption.

4. The vehicle according to claim 2, wherein the control device calculates the predicted electric consumption based on an operating point corresponding to the average operating point corrected using a predetermined time constant so as to be smoothed in a time axis direction.

5. The vehicle according to claim 4, wherein the control device smoothes the average vehicle speed and the average driving force using a different time constant in the smoothing.

6. The vehicle according to claim 5, wherein the time constant for the average vehicle speed is smaller than the time constant for the average driving force.

7. The vehicle according to claim 6 wherein the control device performs smoothing for the average vehicle speed using a different time constant between the driving force required from a road inclination and a remaining driving force of the traction driving force.

8. The vehicle according to claim 5, wherein the control device performs smoothing for the average vehicle speed using a different time constant between the driving force required from a road inclination and a remaining driving force of the traction driving force.

9. The vehicle according to claim 1, wherein
the rotating electric machine is coupled to a driving wheel, and can generate electric power by a rotative force of the driving wheel, and the control device calculates the second electric consumption based on a traveling distance under a state where the electric power is not generated by the rotating electric machine, among the travel distance.

10. The vehicle according to claim 1, further comprising an engine,
wherein the traction driving force is output using a driving force from the rotating electric machine and a driving force from the engine,
the control device executes calculation of the allowed travel distance when the engine is in a non-driven state.

11. The vehicle according to claim 1, further comprising a display unit for notifying a user about the allowed travel distance.

12. A control method implemented by a control device of a vehicle capable of traveling using electric power from a power storage device mounted on the vehicle,
the vehicle including a rotating electric machine for generating traction driving force using electric power from the power storage device,
the control method comprising the steps of, when traveling by electric power from the power storage device:
calculating a first electric consumption based on an average operating point determined from an average vehicle speed and average driving force for every predetermined period,
calculating a second electric consumption based on power consumption and travel distance during the predetermined period, and
calculating an allowed travel distance that the vehicle can travel by the electric power remaining in the power storage device, based on the first and second electric consumption, and a state of charge of the power storage device.

* * * * *